United States Patent
Gottin et al.

(10) Patent No.: US 11,119,879 B2
(45) Date of Patent: Sep. 14, 2021

(54) DETECTION OF RESOURCE BOTTLENECKS IN EXECUTION OF WORKFLOW TASKS USING PROVENANCE DATA

(71) Applicant: EMC IP Holding Company LLC, Hopkinton, MA (US)

(72) Inventors: Vinícius Michel Gottin, Rio de Janeiro (BR); Daniel Sadoc Menasché, Rio de Janeiro (BR); Alex Laier Bordignon, Niterói (BR); Eduardo Vera Sousa, Niterói (BR); Manuel Ramón Vargas Avila, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 649 days.

(21) Appl. No.: 16/038,373

(22) Filed: Jul. 18, 2018

(65) Prior Publication Data
US 2020/0026633 A1   Jan. 23, 2020

(51) Int. Cl.
*G06F 11/30*   (2006.01)
*G06F 11/34*   (2006.01)
*G06F 9/50*   (2006.01)

(52) U.S. Cl.
CPC .......... *G06F 11/3423* (2013.01); *G06F 9/505* (2013.01); *G06F 9/5044* (2013.01); *G06F 11/3433* (2013.01)

(58) Field of Classification Search
CPC .................................................. G06F 11/3423
(Continued)

(56) References Cited

U.S. PATENT DOCUMENTS 10,909,503 B1 *   2/2021   Dias ..................... G06Q 10/103
2009/0007063 A1 *   1/2009   Szpak ...................... G06F 8/34
717/105
(Continued)

OTHER PUBLICATIONS

U.S. Appl. No. 15/364,449 entitled, "Snapshots to Train Prediction Models and Improve Workflow Execution", filed Nov. 30, 2016.
(Continued)

*Primary Examiner* — Timothy A Mudrick
(74) *Attorney, Agent, or Firm* — Ryan, Mason & Lewis, LLP

(57) ABSTRACT

Techniques are provided for detecting resource bottlenecks in workflow task executions using provenance data. An exemplary method comprises: obtaining a state of multiple workflow executions of multiple concurrent workflows performed with different resource allocation configurations in a shared infrastructure environment; obtaining first and second signature execution traces of a task representing first and second resource allocation configurations, respectively; identifying first and second corresponding sequences of time intervals in the first and second signature execution traces for the task, respectively, based on a similarity metric; and identifying a given time interval as a resource bottleneck of a resource that differs between the first and second resource allocation configurations based on a change in execution time for the given time interval between the first and second signature execution traces. The first signature execution trace may be obtained by disaggregating data related to batches of workflow executions.

20 Claims, 9 Drawing Sheets

(58) Field of Classification Search
USPC .......................................................... 702/182
See application file for complete search history.

(56) References Cited

U.S. PATENT DOCUMENTS

| | | | | |
|---|---|---|---|---|
| 2011/0252427 | A1* | 10/2011 | Olston | G06F 16/951 718/102 |
| 2016/0063145 | A1* | 3/2016 | Chang | G06F 30/00 703/6 |
| 2016/0224910 | A1* | 8/2016 | Deng | G06Q 30/016 |
| 2017/0177331 | A1* | 6/2017 | Howard | G06F 16/25 |
| 2017/0269971 | A1* | 9/2017 | Anya | G06Q 10/0633 |
| 2019/0324822 | A1* | 10/2019 | Gottin | G06F 9/4401 |
| 2020/0004903 | A1* | 1/2020 | Gottin | G06Q 10/0633 |

OTHER PUBLICATIONS

U.S. Appl. No. 15/800,587 entitled, "Simulation-Based Online Optimization of Workflows", filed Nov. 1, 2017.
U.S. Appl. No. 16/023,116 entitled, "Workflow Simulation Using Provenance Data Similarity and Sequence Alignment", filed Jun. 29, 2018.
Armel et al., "Is disaggregation the holy grail of energy efficiency? The case of electricity," Energy Policy, vol. 52, pp. 213-234, 2013.
Kim et al., "Unsupervised disaggregation of low frequency power measurements," in Proceedings of the 2011 SIAM International Conference on Data Mining, 2011.
P. Comon, "Independent component analysis, a new concept?," Signal processing, vol. 36, pp. 287-314, 1994.
J. F. Cardoso, "Infomax and maximum likelihood for blind source separation," IEEE signal processing letters, vol. 4, pp. 112-114, 1997.
B. Arons, "A review of the cocktail party effect," Jornal of the American Voice I/O Society, vol. 12, pp. 35-50, 1992.
M. A. Bee, "The cocktail party problem: what is it? How can it be solved? And why should animal behaviorists study it?," Journal of comparative psychology, vol. 122, p. 235, 2008.
C. Fang, "From Dynamic Time Warping (DTW) to Hidden Markov Model (HMM)", University of Cincinnati, vol. 3, p. 19, (2009).
Huang et al., "Unsupervised Joint Alignment of Complex Images", in International Conference on Computer Vision, 2007. ICCV2007 (2007).

* cited by examiner

400

450

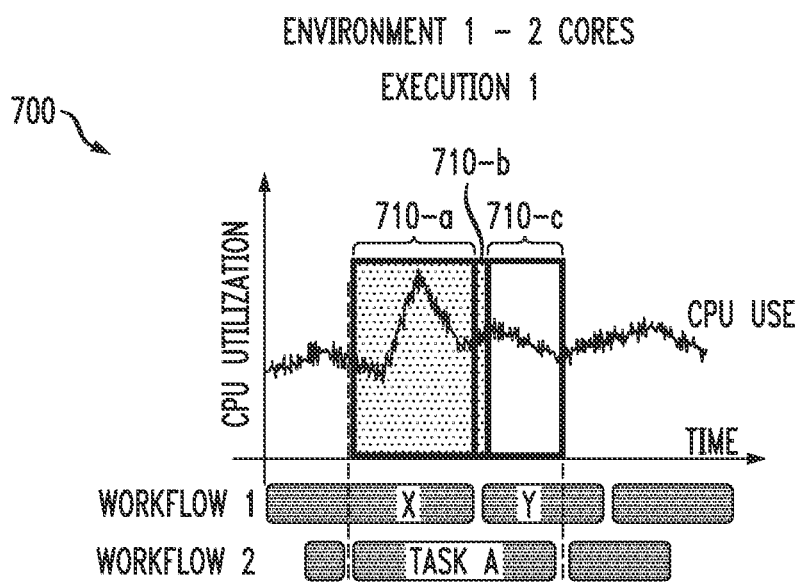
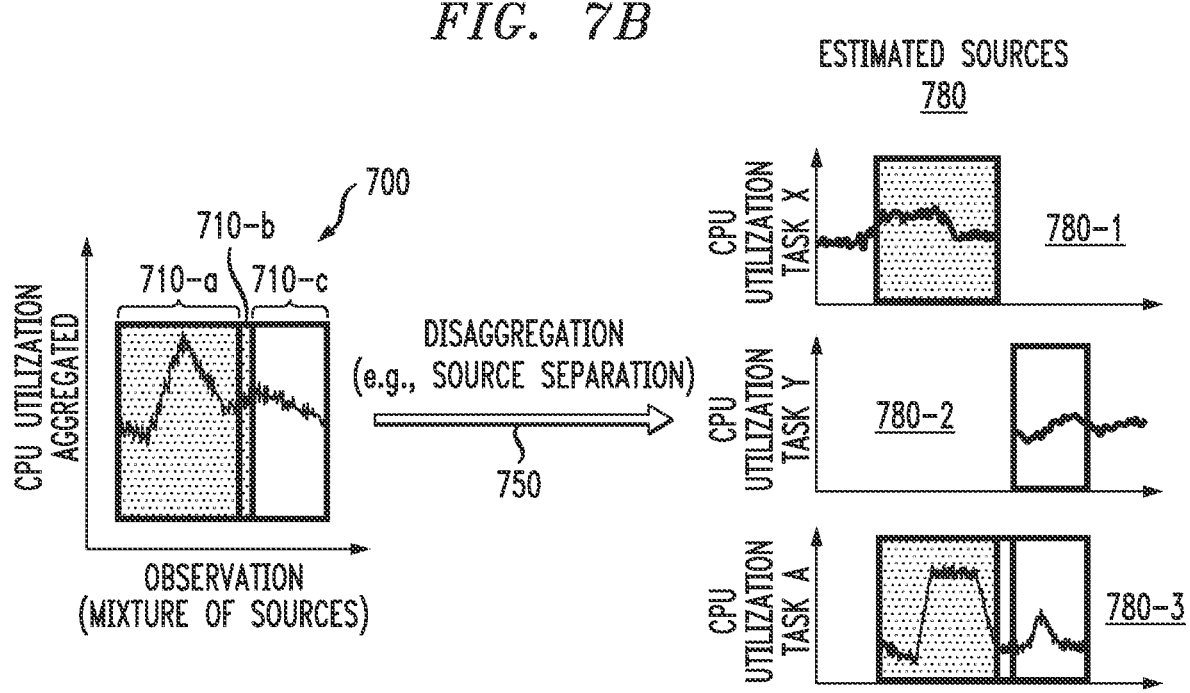

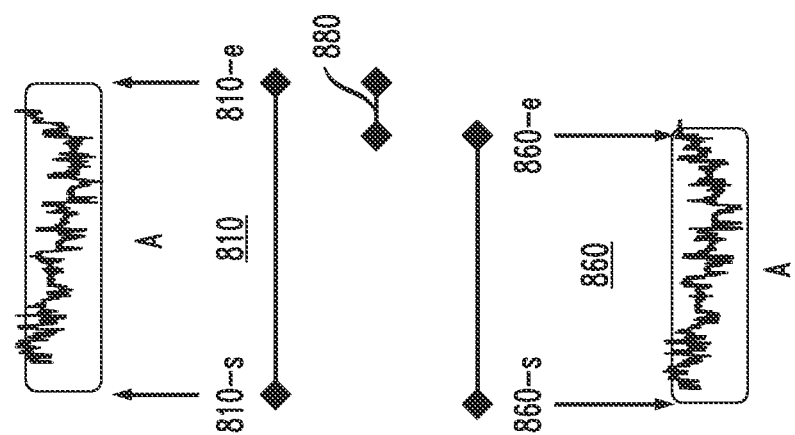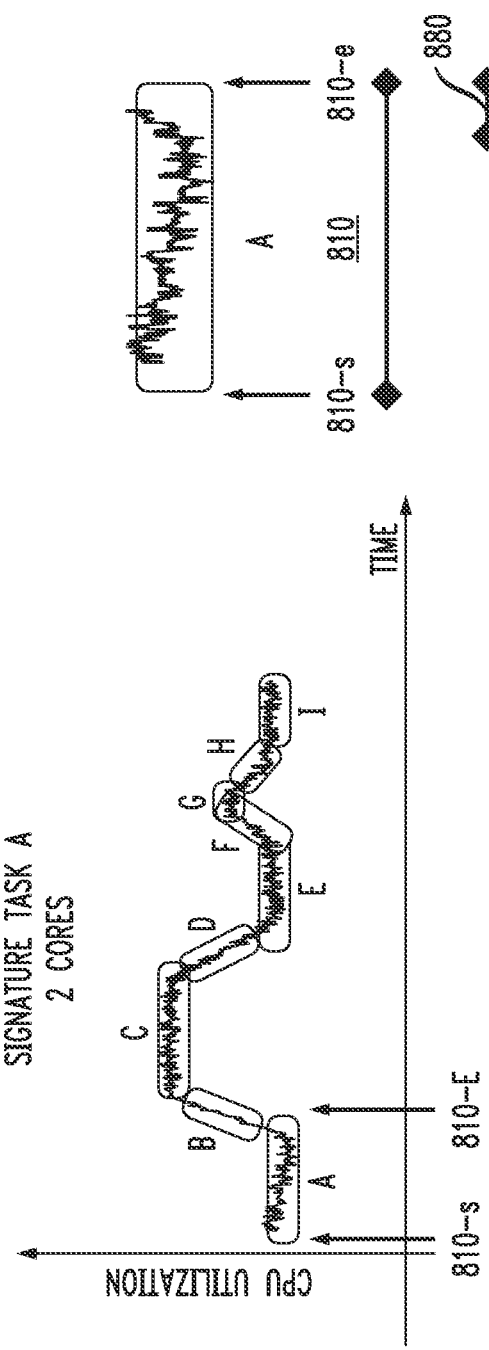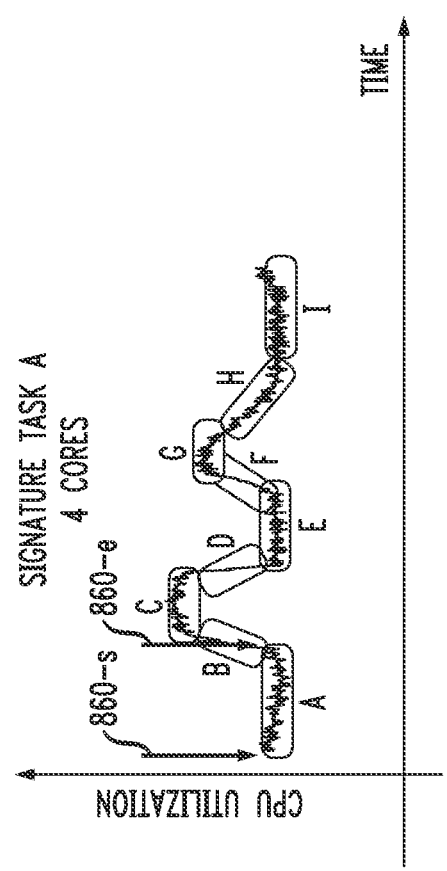
FIG. 8A
FIG. 8B

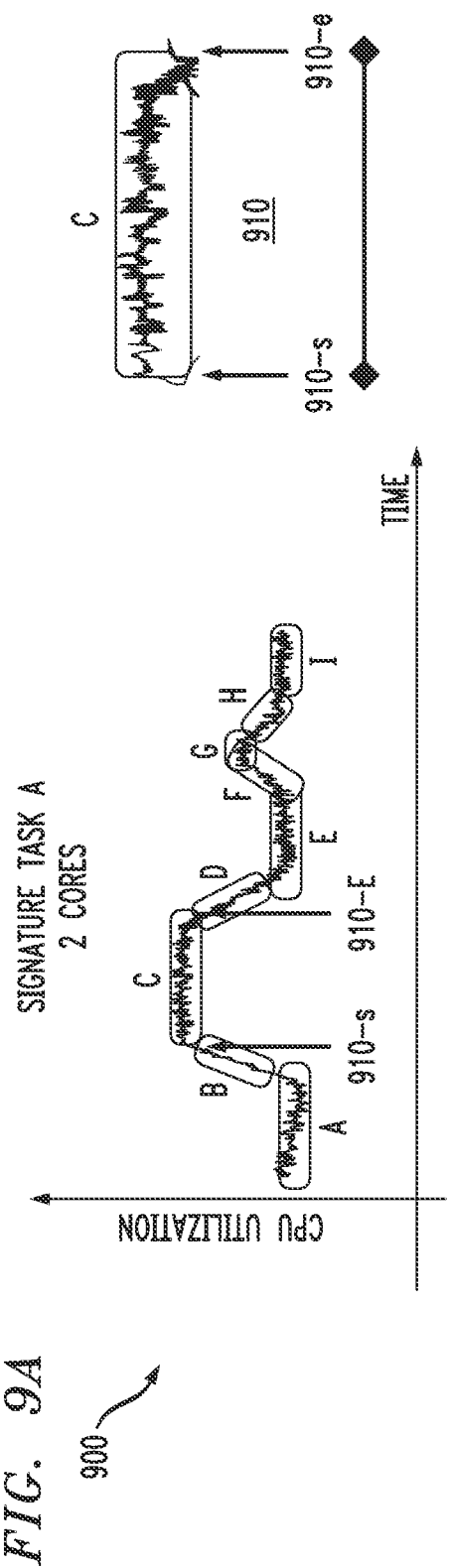
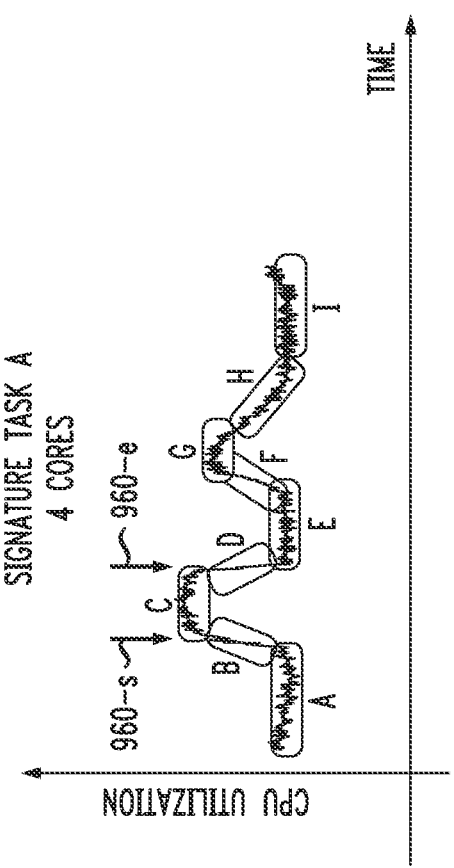
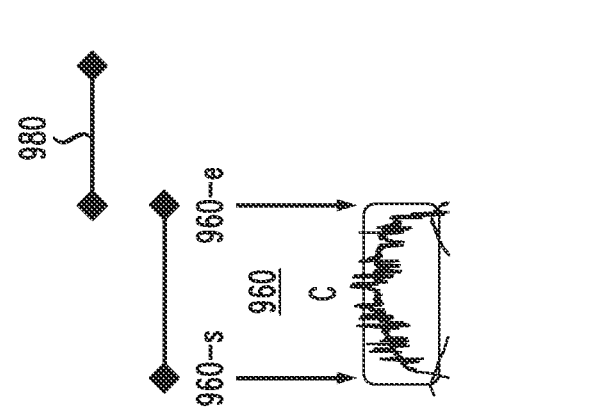
FIG. 9A
FIG. 9B

DETECTION OF RESOURCE BOTTLENECKS IN EXECUTION OF WORKFLOW TASKS USING PROVENANCE DATA

FIELD

The field relates generally to managing execution of one or more workflows.

BACKGROUND

Workflows are a basic building block of many modern industrial activities. Characterizing an amount of resources (e.g., memory and central processing units (CPUs)) that should be employed to execute a given workflow, for example, under a given deadline, is a challenging problem.

One goal of many performance tools, such as performance profilers, is to identify resource bottlenecks for a given application in order to (i) rewrite portions of the software code of the given application, to avoid the identified resource bottlenecks, and/or (ii) upgrade an amount of bottleneck resources in order to improve system performance. A particular resource is said to comprise a system bottleneck if an increment (or upgrade) of the particular resource can significantly improve the execution of an application.

A need exists for improved techniques for detecting resource bottlenecks in workflow task executions.

SUMMARY

Illustrative embodiments of the present disclosure provide for detection of resource bottlenecks in workflow task executions using provenance data. In one embodiment, an exemplary method comprises: obtaining a state of multiple workflow executions of a plurality of concurrent workflows in a shared infrastructure environment, wherein the multiple workflow executions are performed with a plurality of different resource allocation configurations, wherein the state comprises provenance data of the multiple workflow executions and wherein each of the multiple workflow executions is comprised of one or more tasks; obtaining a first signature execution trace of at least one task within the plurality of concurrent workflows representing a first resource allocation configuration, and a second signature execution trace of the at least one task within the plurality of concurrent workflows representing a second resource allocation configuration; identifying a first sequence of time intervals in the first signature execution trace for the at least one task that corresponds to a second sequence of time intervals in the second signature execution trace for the at least one task based on a similarity metric; and identifying a given time interval in the first and second corresponding sequences of time intervals for the at least one task as a resource bottleneck of one or more resources that differ between the first resource allocation configuration and the second resource allocation configuration based on a change in execution time for the given time interval between the first signature execution trace and the second signature execution trace.

In some embodiments, the first signature execution trace is obtained by disaggregating data related to batches of executions of the plurality of concurrent workflows. The step of identifying the first and second sequences of time intervals optionally comprises aligning the first sequence of time intervals and the second sequence of time intervals based on telemetry data information in the first signature execution trace and second signature execution trace, and/or substantially maximizing the similarity metric.

Other illustrative embodiments include, without limitation, apparatus, systems, methods and computer program products comprising processor-readable storage media.

BRIEF DESCRIPTION OF THE DRAWINGS

FIG. 7A illustrates a CPU utilization for an execution of multiple workflows, each comprised of one or more tasks, according to some embodiments;

FIG. 7B illustrates an exemplary disaggregation of the execution of multiple workflows of FIG. 7A, according to at least one embodiment;

FIGS. 8A, 8B, 9A and 9B, collectively, illustrate exemplary alignments of signatures for intervals of a task of concurrent workflows executed in different environments, as well as a related bottleneck identification, according to an embodiment;

DETAILED DESCRIPTION

Figure 1:
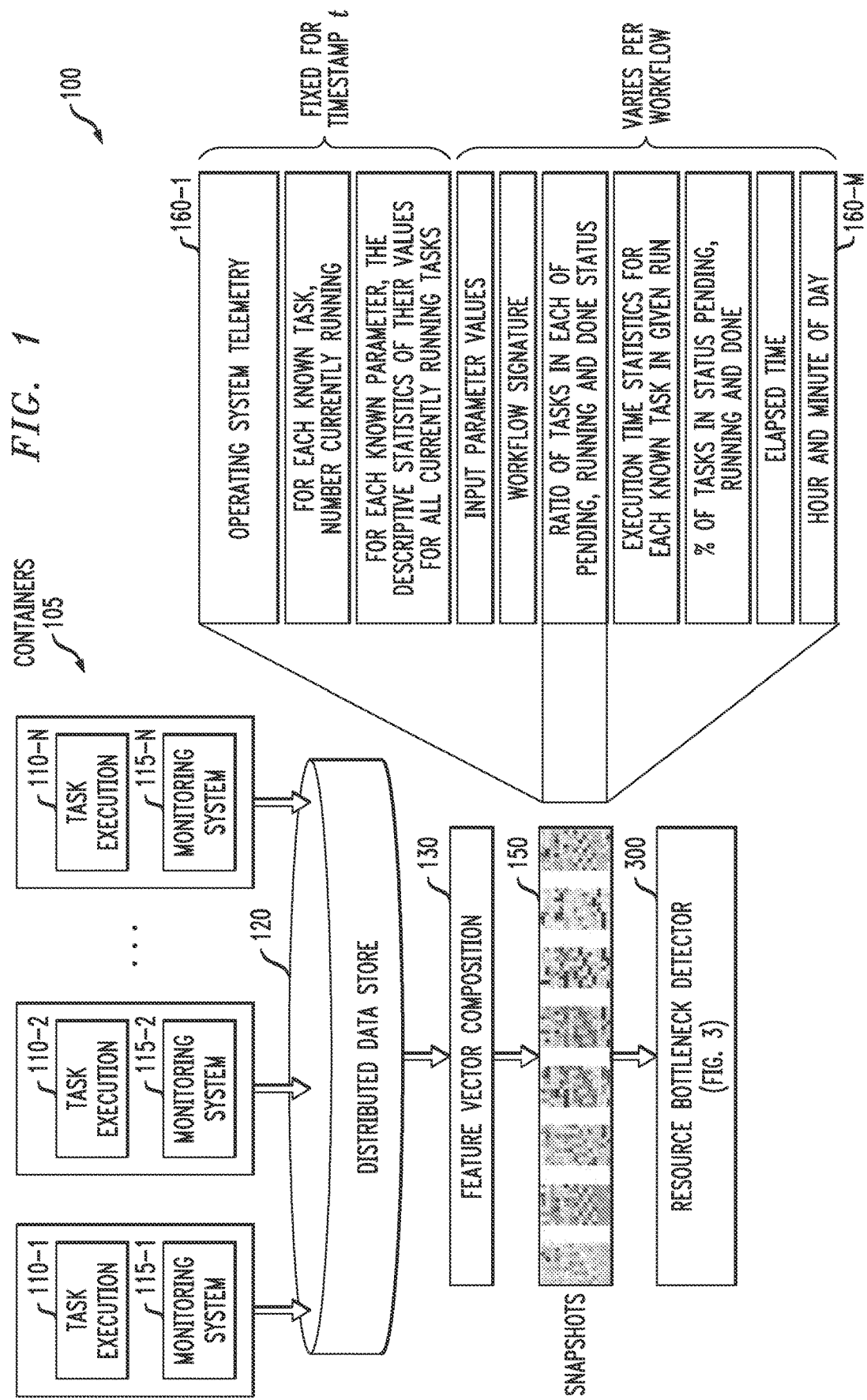
FIG. 1 illustrates an exemplary process for capturing provenance data for a plurality of tasks and for detecting resource bottlenecks in the plurality of tasks, according to some embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detection of resource bottlenecks in workflow task executions using provenance data.

One or more embodiments provide a method for automatic identification of bottlenecks associated with tasks of workflows that run concurrently and asynchronously. The exemplary method receives aggregate data regarding the telemetry and provenance of the workflow executions.

In some embodiments, the disclosed methods for detection of resource bottlenecks in workflow task executions using provenance data comprise an initial disaggregation step, where a canonical telemetry signature is associated with each task. One or more embodiments employ signal disaggregation methods, such as blind source separation, for this purpose.

Thereafter, during a sequence alignment step, signatures corresponding to a given task, executed under different environments, are aligned. Finally, in one or more embodiments, bottlenecks are identified by analyzing disaggregated and aligned segments of telemetry data. One or more aspects of the disclosure recognize that segments of a task that are sensitive to changes in infrastructure correspond to bottlenecks.

As noted above, one goal of many performance tools, such as performance profilers, is to identify resource bottlenecks for a given application in order to rewrite portions of the software code of the given application, to avoid the identified resource bottlenecks, or to upgrade an amount of bottleneck resources in order to improve system performance.

A bottleneck can be identified, for example, by exhaustively submitting the system to multiple resource configurations, keeping all resources, but one, fixed. The resource whose allocation is varied is referred to as a control variable. If the change in the allocation of a particular resource improves the performance of a task, the corresponding resource is a bottleneck for the given task. In contrast, if a resource is not a bottleneck, the system should be insensitive to changes in the allocation of such resource. In this case, in some embodiments, there should exist a one-to-one mapping between system states under all the different executions when varying the allocated amount of non-bottleneck resources.

One challenge in identifying task bottlenecks relates to the fact that, in real-world environments, multiple tasks are typically executed concurrently and one typically needs to resort to aggregated data for the multiple concurrent tasks to characterize a specific task.

In one or more embodiments, the present disclosure determines which parts of each task in a workflow can benefit from additional resources, such as memory or CPU. To this goal, provenance data can be used to identify the beginning and end of a task execution, and telemetry data can be used to automatically identify one or more bottlenecks using the following three stage strategy:

1) Data Disaggregation: The first stage comprises data disaggregation. Given aggregate data related to batches of workflows, one canonical signature is extracted for each of the tasks comprising the workflows.

2) Sequence Alignment: The second stage involves sequence alignment to map task state sequences corresponding to task executions under different environments, subject to different resource allocations. Given a pair of canonical signatures, corresponding to a given task executed in two distinct environments, the goal in some embodiments is to substantially align such sequences to find a correspondence between similar states.

3) Sequence Analysis: The third stage refers to the analysis of the aligned sequences for bottleneck identification. Given a pair of aligned sequences, the segments of each sequence are identified that are sensitive (respectively, insensitive) to changes in the environment, wherein the controlled resource corresponds to a bottleneck (respectively, does not correspond to a bottleneck).

One or more embodiments provide a methodology to identify task bottlenecks based on disaggregated telemetry data. This identification is not trivial when there are multiple workflows running simultaneously, where the collected telemetry data is related to a batch of workflows. In summary, the detection of task bottlenecks from aggregated data gives rise to the following exemplary challenges:

identifying which segments of the aggregated telemetry refer to each specific task;

aligning telemetry data sequences generated by executions of workflows in different infrastructures; and detecting task bottlenecks in the aligned telemetry data.

In environments where multiple workflows are executed concurrently, challenges may exist for the task of bottleneck detection, because 1) the data collected in such environments is aggregated and 2) prior knowledge of the behavior of specific tasks may not be available. Thus, the data needs to be disaggregated, as discussed further below in conjunction with FIGS. 7A and 7B, for example.

For aggregated telemetry data, more than one task of a workflow is executed at the same time. One challenge comprises determining which part of this telemetry data can be associated with a specific task, without prior knowledge of the behavior of the task. After applying the disclosed disaggregation techniques, each task is associated with its telemetry sequence. Such sequence is referred to as the task canonical signature.

Once the canonical signatures are determined, another challenge comprises using such signatures to find bottlenecks. To this aim, pairs of signatures are considered. Every pair contains two signatures corresponding to the same task, each of them executed in a different infrastructure setup. Then, the problem becomes aligning signatures in each pair, e.g., using disclosed sequence alignment algorithms.

Using the aligned sequences, the bottlenecks can be identified (e.g., which segments of the sequences can benefit from an increase of a certain resource, for example, number of CPU cores, amount of memory or disk velocity). The segments of the sequences that remain roughly unchanged across the infrastructure are segments where no bottleneck was found.

Task bottleneck detection is relevant for the following exemplary reasons:

without understanding bottlenecks, it is difficult to orchestrate the best allocation of resources;

substantially optimal resource allocation often translates into significant operational and financial gains; and understanding bottlenecks can indicate which control variables can be ignored and which need to be the focus of an automated reasoning for resource allocation and intelligent scheduling.

Provenance Data Capture and Snapshots

U.S. patent application Ser. No. 15/364,449, entitled "Snapshots to Train Prediction Models and Optimize Workflow Execution," (now U.S. Pat. No. 10,909,503), and U.S. patent application Ser. No. 16/023,116, entitled "Workflow Simulation Using Provenance Data Similarity and Sequence Alignment," incorporated by reference herein in their entireties, describe methods for managing the execution of workflows while orchestrating the collection of snapshots as time-stamped contextual provenance and telemetry information datasets.

FIG. 1 illustrates an exemplary process 100 for capturing provenance data for a plurality of tasks 110-1 through 110-N and for detecting resource bottlenecks in the plurality of tasks 110-1 through 110-N, according to some embodiments. As shown in FIG. 1, the plurality of tasks 110-1 through 110-N execute on one or more containers 105. The plurality of tasks 110-1 through 110-N are monitored by corresponding monitoring systems 115-1 through 115-N which capture the provenance data. The monitoring systems 115-1 through 115-N store the collected provenance data in a distributed data store 120 in the embodiment of FIG. 1.

A feature vector composition process 130 is applied to the provenance data in the distributed data store 120 to extract a plurality of the extracted features 160-1 through 160-M from the provenance data and to generate one or more snapshots 150 comprising the extracted features 160-1 through 160-M. FIG. 1 illustrates one exemplary configuration of features 160 that comprise a snapshot 150.

In the example of FIG. 1, the exemplary snapshot 150 comprises the following exemplary data commonly in the exemplary snapshot 150 extracted from workflow executions: operating system telemetry; for each known task, the number currently running; for each known parameter, the descriptive statistics of their values for all currently running tasks; input parameter values; workflow signature; ratio of tasks in pending, running and done status; execution time statistics for each known task in given run; percentage (%) of tasks with status of pending, running and done; elapsed time; and actual time (e.g., hour and minute of day).

As shown in FIG. 1, an exemplary resource bottleneck detector 300, as discussed further below in conjunction with FIG. 3, processes the snapshots 150 to detect resource bottlenecks in the plurality of tasks 110-1 through 110-N, according to some embodiments.

As used herein, the provenance data optionally includes telemetry data.

An exemplary snapshot of a workflow w at instant t includes provenance data of the workflow w at that instant, as well as contextual information of all other workflows running concurrently with w. The set of workflows running concurrently is referred as a batch of workflows.

State Mapping Function

U.S. patent application Ser. No. 15/800,587, entitled "Simulation-Based Online Optimization of Workflows," (now U.S. Pat. No. 11,004,025), incorporated by reference herein in its entirety, defines a state mapping function, henceforth referred to as a mapping function as $$f: X \xrightarrow{a} Y.$$

This function relates states in the state space, mapping state X to state Y under configuration a, where the configuration corresponds to an attribution of values for the control variable(s). Thus, the state mapping establishes that in state X applying configuration a causes the system to transition from X to a state that is well approximated by state Y. State Y is the nearest neighbor of X, in the state space, under the given set of control variable(s) value(s) a.

Figure 2:
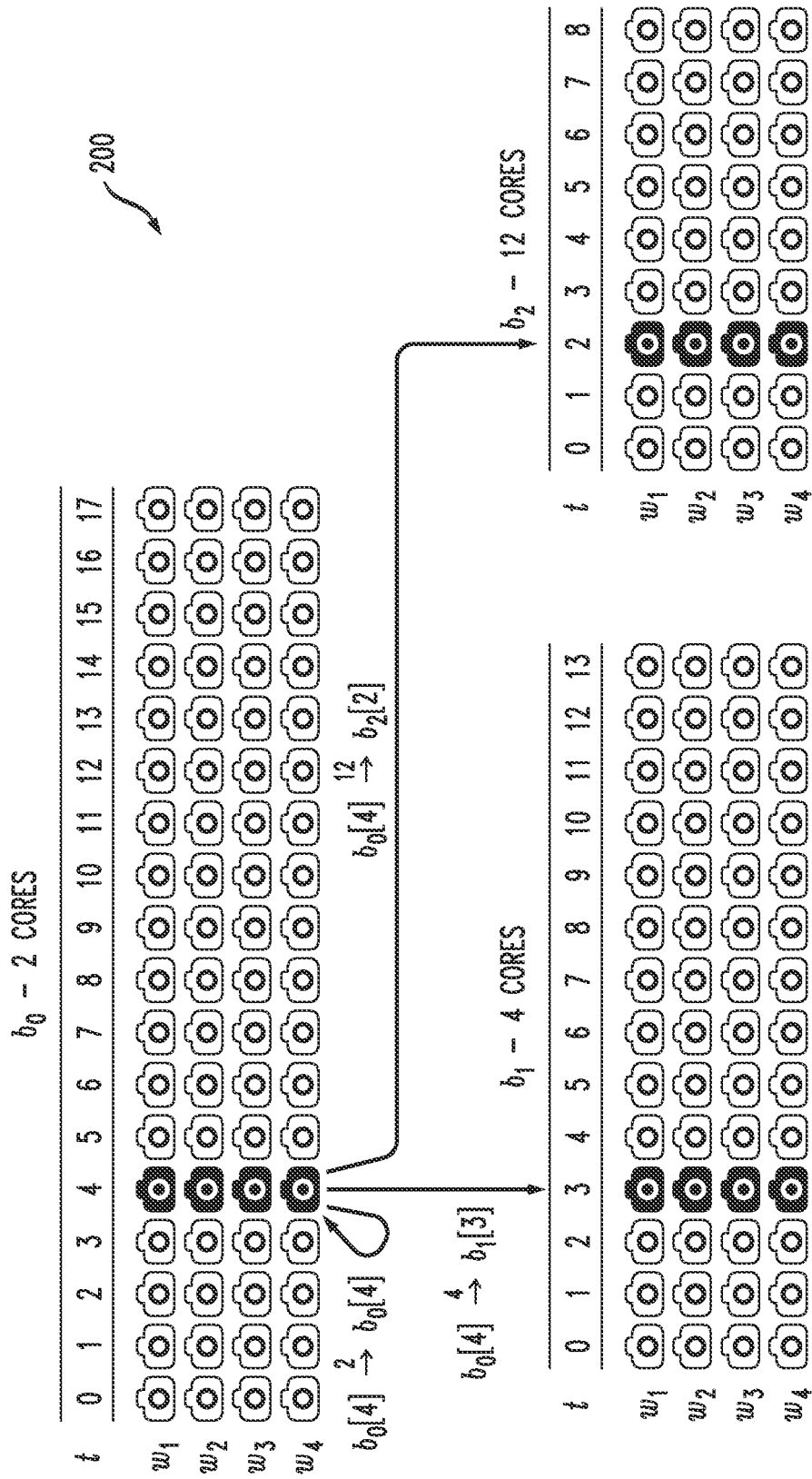
FIG. 2 illustrates an example of a state mapping function for mapping of a given state under different actions in a state space, according to an exemplary embodiment.

FIG. 2 illustrates an example of an endogenous state mapping function, f, for mapping 200 of state $b_{0\ [4]}$ (e.g., snapshot 4 of state $b_0$) under actions 2, 4 and 12 (e.g., exemplary changes in number of cores, the control variable) in the endogenous state space, according to an exemplary implementation of the endogenous mapping function.

It is noted that the disclosed state mapping function 'translates' the current state to the substantially most similar state under a different configuration of the control variables. Notice that this mapping does not represent an advance in execution time—it 'translates' the current state to the substantially most similar one with a different value for the control variables. In particular, in some embodiments, the mapping does not account for immediate workflow progress, e.g., if the configuration is not changed, a state is always mapped into itself through a self-loop. In one example, state $b_0$ [4] under a configuration with 2 cores translates into $b_0$ [4] itself, while a configuration with 12 cores translates into $b_2$ [2].

Many alternative implementations of endogenous mapping functions can be defined, as would be apparent to a person of ordinary skill in the art. U.S. patent application Ser. No. 15/800,587, (now U.S. Pat. No. 11,004,025), describes two exemplary mapping examples with linear mapping based on batch length.

State Mapping Function based on Telemetry Data

Workflows executed in different environments have different execution times. Therefore, it is often necessary to align the telemetry data series to produce the telemetry footprint of each trace. There are several algorithms to perform alignment between time series with different lengths, such as Dynamic Time Warping (DTW) (see, e.g., C. Fang, "From Dynamic Time Warping (DTW) to Hidden Markov Model (HMM)," University of Cincinnati, Vol. 3, page 19 (2009)). DTW is adopted in one or more embodiments as the reference algorithm for telemetry alignment.

As shown in U.S. patent application Ser. No. 16/023,116, referenced above, using DTW and telemetry data, mappings can be defined between snapshots with similar provenance. For each source snapshot, the target snapshot is selected with the substantially closest progress level compared to the source, where distance is measured using telemetry data. Generally, the behavior of telemetry data is expected to be similar when two different traces execute the same tasks, which yields a notion of progress. Leveraging this idea, a mapping can be determined between snapshots with substantially the same signature vector that maximizes the overlap in terms of the amount of work executed per task.

Resource Bottleneck Detection in Workflow Task Executions

Figure 3:
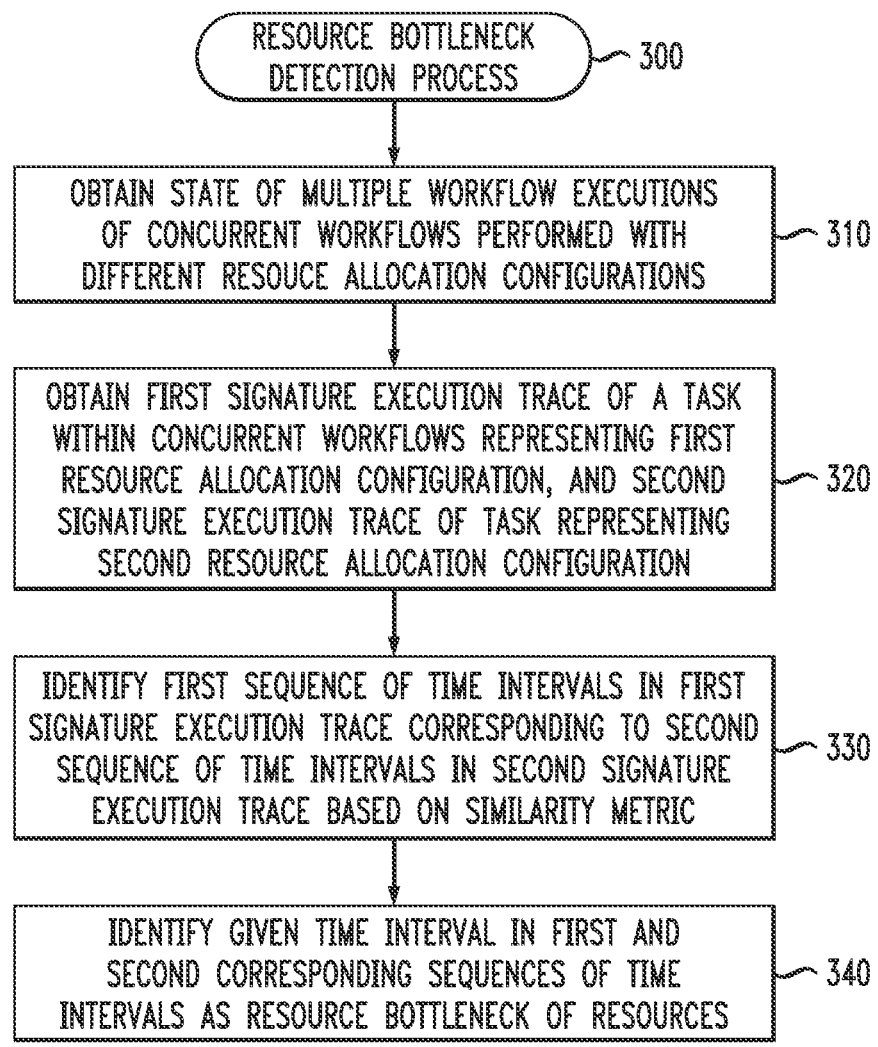
FIG. 3 is a flow chart illustrating an exemplary implementation of a resource bottleneck detection process, according to one embodiment of the disclosure.

FIG. 3 is a flow chart illustrating an exemplary implementation of a resource bottleneck detection process 300, according to one embodiment of the disclosure. As shown in FIG. 3, the exemplary resource bottleneck detection process 300 initially obtains a state of multiple workflow executions of concurrent workflows in a shared infrastructure environment during step 310. The multiple workflow executions are performed with a plurality of different resource allocation configurations, and the state comprises provenance data of the multiple workflow executions. Each of the multiple workflow executions is comprised of a plurality of tasks.

During step 320, the exemplary resource bottleneck detection process 300 obtains a first signature execution trace of a task within the plurality of concurrent workflows representing a first resource allocation configuration, and a second signature execution trace of the task representing a second resource allocation configuration.

The resource bottleneck detection process 300 identifies a first sequence of time intervals in the first signature execution trace for the task during step 330 that corresponds to a second sequence of time intervals in the second signature execution trace for the task based on a similarity metric.

Finally, during step 340, a given time interval is identified in the first and second corresponding sequences of time intervals for the task as a resource bottleneck of one or more resources. The one or more resources differ between the first resource allocation configuration and the second resource allocation configuration based on a change in execution time for the given time interval between the first signature execution trace and the second signature execution trace.

Generally, the disclosed techniques for detection of resource bottlenecks in workflow task executions aim to determine which parts of each task in a workflow can benefit from additional resources. Recall that a scenario is considered where multiple tasks are executed by different workflows running concurrently.

In some embodiments, the workflow characterization is based on a disaggregation of telemetry and provenance data. As noted above, a snapshot comprises aggregated telemetry and provenance data. Therefore, one step of the disclosed resource bottleneck detection method comprises finding a canonical telemetry signature associated to each tasks. Thus, techniques for information disaggregation are adapted and employed herein.

Given a set of time series comprising aggregated telemetry data corresponding to redundant executions of a workflow, e.g., executions without changes in the setup of control variables, the output of the first stage of the disclosed method is a set of multiple time series, each one corresponding to a different task.

Figure 4A:
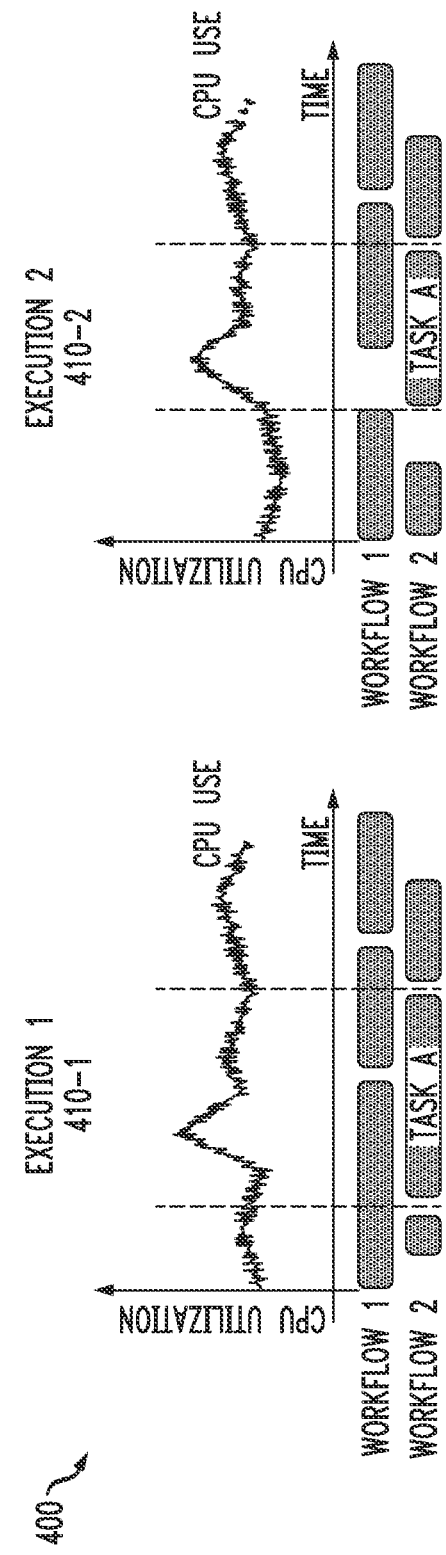
FIGS. 4A and 4B, collectively, illustrate an exemplary CPU utilization by multiple concurrent workflows in different environments having different resource allocations, according to an embodiment.
Figure 4B:
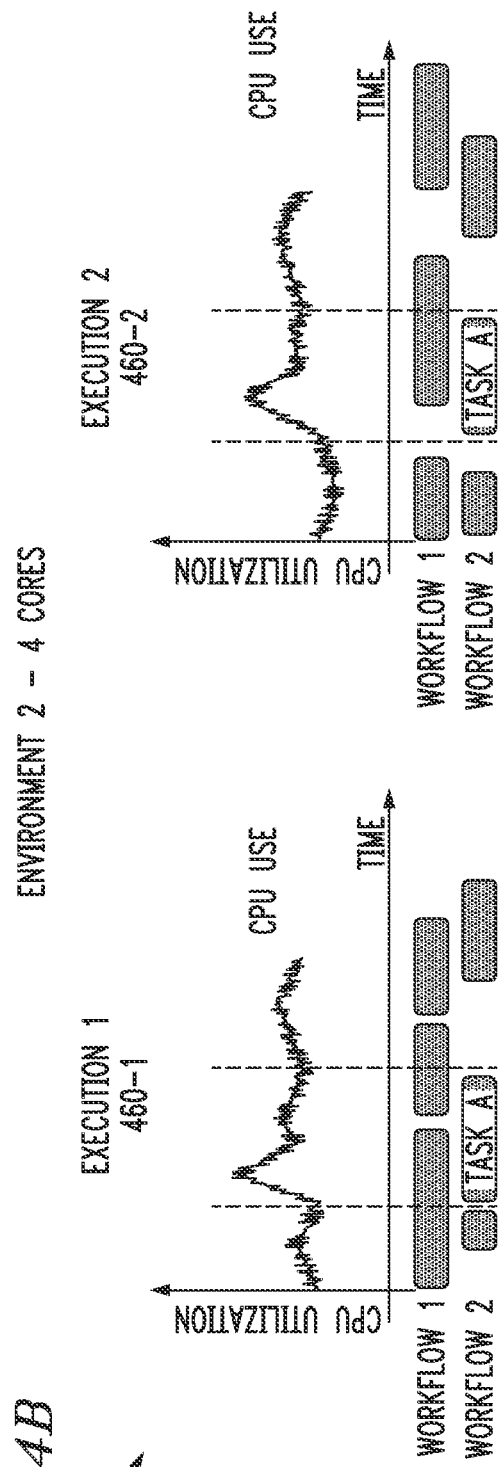

FIGS. 4A and 4B, collectively, illustrate an exemplary CPU utilization by multiple concurrent workflows in different environments having different resource allocations (such as a different number of processing cores), according to an embodiment. As shown in FIGS. 4A and 4B, multiple concurrent workflows (Workflow 1 and Workflow 2) are each executed two times 410-1, 410-2 and 460-1, 460-2 (Execution 1 and Execution 2) for two distinct configurations (two and four processing cores, respectively). FIG. 4A illustrates a first configuration 400 (environment 1) with two processing cores and FIG. 4B illustrates a second configuration 450 (environment 2) with four processing cores.

Figure 5A:
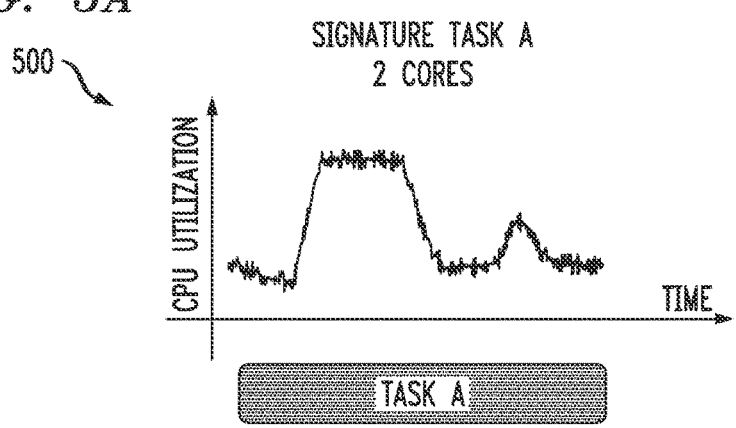
FIGS. 5A and 5B, collectively, illustrate exemplary canonical task signatures for a given task of the multiple concurrent workflows and resource allocation configurations of FIGS. 4A and 4B, respectively, according to one embodiment of the disclosure.
Figure 5B:
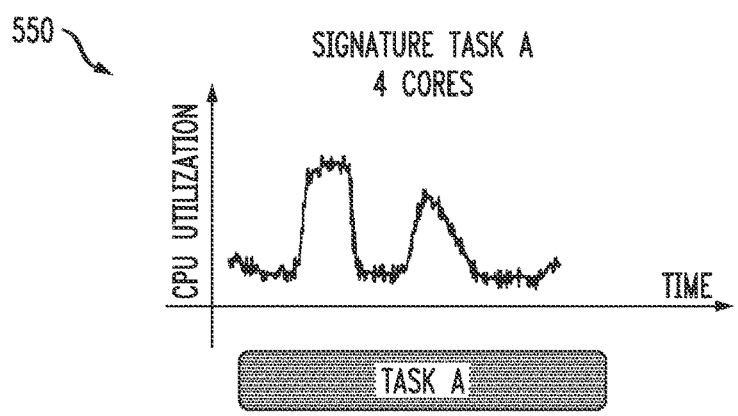

FIGS. 5A and 5B, collectively, illustrate exemplary canonical task signatures 500, 550, respectively for a given task of the multiple concurrent workflows of FIGS. 4A and 4B under the distinct resource allocation configurations 400, 450 of FIGS. 4A and 4B, according to an embodiment of the disclosure.

Figure 6:
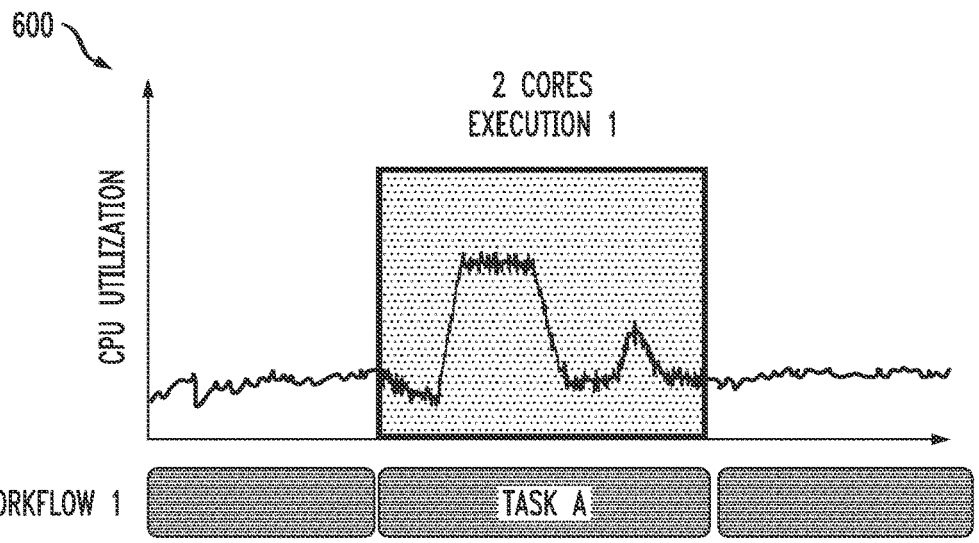
FIG. 6 illustrates an exemplary execution of a single workflow using two processing cores, according to one embodiment.

FIG. 6 illustrates an exemplary execution 600 of a single workflow 1 using two processing cores, according to one embodiment. In the example of a single workflow 1 executing in FIG. 6, one execution is enough to suggest the signature of each task of the workflow 1, such as task A. In other words, the CPU Utilization during task A can be considered the "canonical signature" of CPU Utilization of task A with two processing cores (i.e., no disaggregation is necessary).

If multiple executions of the single workflow 1 are available, a composition of those series is considered (for example, by taking an average of the multiple executions).

FIG. 7A illustrates a CPU utilization for an execution 700 of multiple workflows 1 and 2, each comprised of one or more tasks, according to some embodiments. Workflow 1, for example, comprises tasks X and Y, while workflow 2 comprises task A. One execution of multiple workflows 1 and 2 provides an observation of the sum of the influences on CPU Utilization of component tasks X, A and Y.

As shown in FIG. 7A, the tasks partially overlap in overlap regions 710-$a$ through 710-$c$. For example, overlap region 710-$a$ corresponds to an overlap for a portion of task X and a beginning of task A; overlap region 710-$b$ corresponds only to task A; and overlap region 710-$c$ corresponds to an overlap for a portion of task and a portion of task Y. Thus, disaggregation is necessary.

FIG. 7B illustrates an exemplary disaggregation 750 of the execution 700 of multiple workflows 1 and 2 of FIG. 7A, according to at least one embodiment. Generally, the exemplary disaggregation 750 of FIG. 7B aims to obtain a representative series of CPU utilizations for each of the component tasks X, A and Y of FIG. 7A.

As shown in FIG. 7B, for the observation 700 of FIG. 7A with the mixture of sources comprising overlap regions 710-$a$ through 710-$c$, the exemplary disaggregation 750 comprises, for example, a source separation. Typically, the canonical signatures obtained by the exemplary disaggregation 750 will be estimates 780 of the original sources of observation 700. As shown in FIG. 7B, the estimated source 780-1 for task X is obtained only from overlap region 710-$a$ (where task X executes); the estimated source 780-2 for task Y is obtained only from overlap region 710-$c$ (where task Y executes); and the estimated source 780-3 for task A is obtained from overlap regions 710-$a$ through 710-$c$ (where task A executes).

Thus, given the disaggregated data, one goal is to identify similarities between the disaggregated traces. To this aim, a mapping function associates similar states of a task executed within different environments, under different control variables. This second stage of the disclosed method is referred to as sequence alignment. To determine the substantially optimal state mapping, telemetry-based sequence alignment strategies are employed in one or more embodiments. See, for example, U.S. patent application Ser. No. 16/023,116, referenced above.

After the sequence alignment stage, the last step comprises analyzing the behavior of the task of interest, executed under various environments (corresponding to distinct control variables). If the behavior is sensitive to changes in control variables, the resource corresponding to the control variable is assumed to be a bottleneck.

FIGS. 8A and 8B, collectively, illustrate an exemplary alignment of signatures 800, 850 for an exemplary interval A of task A of concurrent workflows executed in different environments having different resource allocations (such as a different number of processing cores), according to an embodiment. FIG. 8A illustrates the alignment of the starting 810-$s$ and ending 810-$e$ points of an interval A in the signature 800 of the execution of task A with the first configuration with two processing cores, with the corresponding starting 860-$s$ and ending 860-$e$ points of the corresponding interval A in the signature 850 in FIG. 8B of task A with the second configuration with four processing cores.

Portions 810 and 860 of FIGS. 8A and 8B are used for bottleneck identification, as discussed further below.

Characterization of Tasks of a Workflow

The first step of the task characterization comprises collecting telemetry data associated to the workflows, to obtain the snapshot presented in FIG. 1. Each batch of workflows is associated with multiple traces, where each trace corresponds to an execution of the batch. In particular, for certain batches, multiple executions may be associated with to the same setup of control variables. Such executions are referred to as redundant executions, and they simplify the process of data disaggregation to distill information about tasks from aggregate data. The number of redundant executions required for the efficient deployment of disaggregation depends on a number of factors, including, for example, the number of control variables, tasks involved, overlap between tasks and the disaggregation algorithm adopted.

Once the data is collected, executions associated with similar control variables are grouped in clusters. Each cluster corresponds to a set of batches which were executed under similar infrastructures and inputs. From each cluster, a canonical signature of a task is obtained in the corresponding infrastructure, as further detailed below.

Provenance data comprising instants at which each task starts and ends at each batch execution determines segments (windows) of telemetry data associated with each task. Each segment (window) corresponds to aggregate telemetry data collected during the execution of a given task. In an analogy with the audio blind source separation problem, each segment corresponds to a different microphone, collecting data on a given environment (infrastructure). The set of segments corresponding to a given task is then used as input to a data disaggregation algorithm, which produces the canonical telemetry signature for the considered task. The process is then repeated for all of the tasks of interest.

Given the canonical signatures of a task under various environments, they are aligned using the disclosed sequence alignment methods. Then, the aligned sequences are used for bottleneck identification.

Bottleneck Identification

To identify task bottlenecks, the resulting telemetry alignments are compared and their behavior is analyzed. Several methodologies for these tasks can be applied.

FIGS. 8A and 8B illustrate one exemplary bottleneck identification method. The starting points 810-s and 860-s of the aligned series and the ending points 810-e and 860-e of the aligned series are shown. Thereafter, the determined intervals are compared for indications that a related change in resource allocations between the execution environment of FIG. 8A and the execution environment of FIG. 8B leads to a decrease or increase of the length (execution time) of the interval. Region 880 corresponds to a reduction in execution time for a change from two processing cores to four processing cores.

The comparison of the intervals for task A highlights that an increase in the number of cores (from 2 to 4 cores) shortens the execution time by roughly 10% (the difference 880 in the length of the intervals).

A probability of the resource allocation being a bottleneck of the corresponding task is assigned, proportional to the sensitivity of the identified change in the execution time 880. Since a doubling in the resources yields a very modest decrease in execution time 880, interval A of Task A is assigned a low probability of being a CPU bottleneck.

The alignment of the series is optionally revised with other possible matchings; pondering the assigned probability of the resource allocation being a bottleneck by the relative confidence in each alignment.

FIGS. 9A and 9B, collectively, illustrate an exemplary alignment of signatures 900, 950 for interval C of task A of the concurrent workflows shown in FIGS. 8A and 8B, according to one embodiment. FIG. 9A illustrates the alignment of interval C in signature 900 for execution of task A with the first configuration with two processing cores, with interval C of the signature 950 in FIG. 9B for execution of task A with the second configuration with four processing cores, in a similar manner as FIGS. 8A and 8B.

FIGS. 9A and 9B also further illustrate the exemplary bottleneck identification method. The starting points 910-s and 960-s of the aligned series for interval C and the ending points 910-e and 960-e of the aligned series are shown. Thereafter, the determined intervals are compared for indications that a related change in resource allocations between the execution environment of FIG. 9A and the execution environment of FIG. 9B leads to a decrease or increase of the length (execution time) of the interval. Region 980 corresponds to a significant reduction in execution time for the change from two processing cores to four processing cores. Thus, interval C in task A is identified as a potential CPU bottleneck.

In particular, an increase in the number of cores (from 2 to 4 cores between FIGS. 9A and 9B) leads to a significant decrease of the execution time 980 of that interval. The reduction in the length 980 of interval C indicates that the corresponding task is sensitive to the CPU allocation. Thus, since interval C is sensitive to the number of CPUs allocated, this is evidence that in this interval C of the task A, the availability of CPU resources is a bottleneck for the execution of Task A, and by consequence, of Workflows 1 and 2.

The disclosed workflow bottleneck characterization techniques have a number of exemplary applications, such as anomaly detection, resource allocation and load balancing, each discussed hereinafter.

Anomaly Detection and Security

The characterization of normal behavior of tasks through their canonical signatures can benefit the detection of anomalies. If the behavior of a given task significantly deviates from the canonical signatures of the known tasks, the given task must be analyzed with greater scrutiny.

Resource Allocation in Multi-Tenant Environments

Given knowledge about task bottlenecks, one can determine when the allocation of a certain class of resource is most relevant to improve the performance of a task and satisfy a Service Level Agreement (SLA). In multi-tenant environments, intelligent dynamic resource allocation and scheduling strategies can benefit from this disclosure.

Load Balancing and Migration in Hybrid Clouds

Given a task bottleneck, when that task (or similar tasks) are executed in another workflow, their behavior can be anticipated to smooth the system load. If a bottleneck is envisioned in advance, one can better perform load balancing and task migration. In addition, if it is anticipated that additional resources will be needed, one can get such resources externally in hybrid clouds.

One or more embodiments provide tools for automatic characterization of tasks of a workflow in an environment with multiple workflows running simultaneously. Given aggregate telemetry and provenance data about batches of workflows, the disclosed resource bottleneck detection techniques determine which parts of each of the tasks in a workflow can benefit from additional resources, such as memory or CPU.

Some embodiments divide the workflow characterization problem into two distinct problems: telemetry disaggregation, and state mapping and bottleneck identification. Given multiple runs of aggregate telemetry data on different executions of the workflow, the telemetry is split into its constituent components, where each component is associated with a given task. Then, multiple executions of the tasks are considered under different infrastructures, and the task states are mapped in such a way that similar states are mapped to each other. Task bottlenecks are identified as segments of the tasks which are more sensitive to infrastructural changes.

One or more embodiments of the disclosure provide improved methods, apparatus and computer program products for detection of resource bottlenecks in workflow task executions using provenance data. The foregoing applications and associated embodiments should be considered as illustrative only, and numerous other embodiments can be configured using the techniques disclosed herein, in a wide variety of different applications.

It should also be understood that the disclosed resource bottleneck detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for resource bottleneck detection may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource bottleneck detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource bottleneck detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
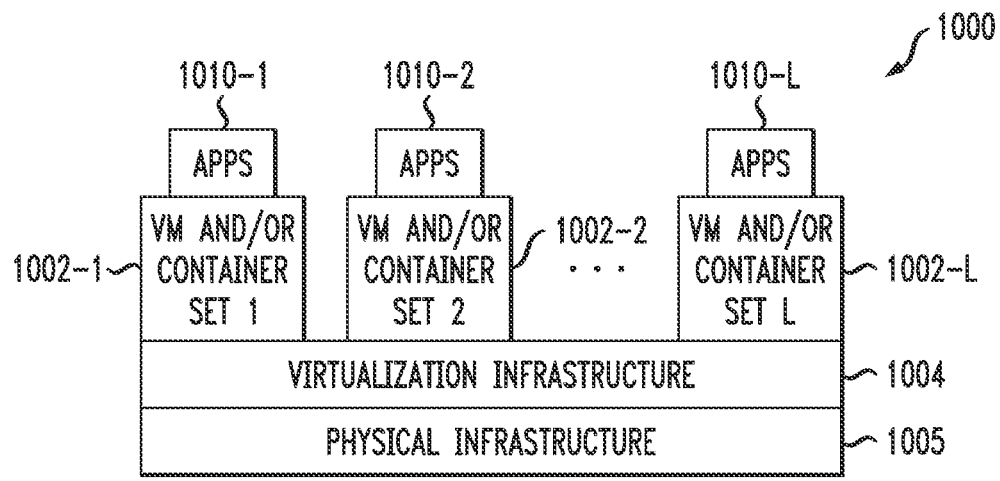
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the resource bottleneck detection system. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide resource bottleneck detection functionality of the type described above for one or more processes running on a given one of the VMs. For example, each of the VMs can implement resource bottleneck detection logic and associated techniques for providing resource bottleneck detection for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide resource bottleneck detection functionality of the type described above for one or more processes running on different ones of the containers. For example, a container host device supporting multiple containers of one or more container sets can implement one or more instances of resource bottleneck detection control logic and associated functionality for detecting bottlenecks.

As is apparent from the above, one or more of the processing modules or other components of the disclosed resource bottleneck detection system may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
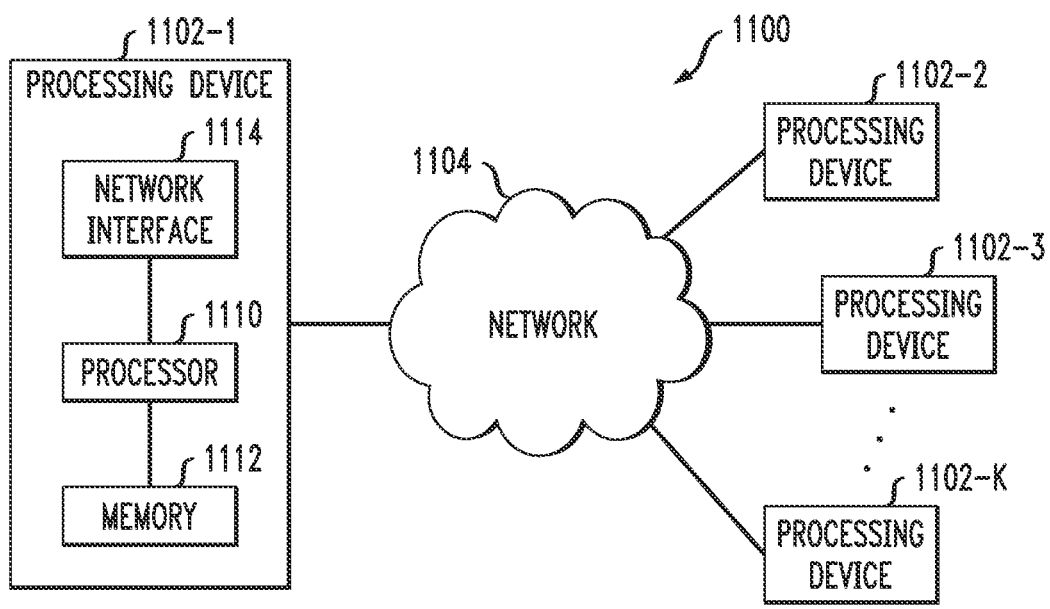
FIG. 11 illustrates another exemplary processing platform that may be used to implement at least a portion of one or more embodiments of the disclosure.

Multiple elements of system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a state of multiple workflow executions of a plurality of concurrent workflows in a shared infrastructure environment, wherein said multiple workflow executions are performed with a plurality of different resource allocation configurations, wherein said state comprises provenance data of said multiple workflow executions and wherein each of said multiple workflow executions is comprised of one or more tasks;

obtaining a first signature execution trace of at least one task within the plurality of concurrent workflows representing a first resource allocation configuration, and a second signature execution trace of said at least one task within the plurality of concurrent workflows representing a second resource allocation configuration;

identifying, using at least one processing device, a first sequence of time intervals in said first signature execution trace for said at least one task that corresponds to a second sequence of time intervals in said second signature execution trace for said at least one task based on a similarity metric; and identifying, using the at least one processing device, a given time interval in said first and second corresponding sequences of time intervals for said at least one task as a resource bottleneck of one or more resources that differ between said first resource allocation configuration and said second resource allocation configuration based on a change in execution time for the given time interval between the first signature execution trace and the second signature execution trace.

2. The method of claim 1, wherein the resource bottleneck identifies said at least one task within the plurality of concurrent workflows as responsive to changes in the resource allocation of the corresponding resources.

3. The method of claim 2, wherein the allocation of said corresponding resources in a new execution of a plurality of workflows comprised of said at least one task is adjusted to substantially minimize said resource bottleneck.

4. The method of claim 2, wherein a new execution of a plurality of workflows comprised of said at least one task is substantially optimized by adjusting said corresponding resources in order to substantially minimize said resource bottleneck.

5. The method of claim 1, wherein said step of obtaining said first signature execution trace comprises disaggregating data related to batches of executions of the plurality of concurrent workflows.

6. The method of claim 1, wherein said step of identifying said first and second sequences of time intervals comprises aligning said first sequence of time intervals and said second sequence of time intervals based on telemetry data information in said first signature execution trace and second signature execution trace.

7. The method of claim 1, wherein step of said identifying said first and second sequences of time intervals comprises substantially maximizing the similarity metric.

8. A system, comprising:
a memory; and
at least one processing device, coupled to the memory, operative to implement the following steps:
obtaining a state of multiple workflow executions of a plurality of concurrent workflows in a shared infrastructure environment, wherein said multiple workflow executions are performed with a plurality of different resource allocation configurations, wherein said state comprises provenance data of said multiple workflow executions and wherein each of said multiple workflow executions is comprised of one or more tasks;
obtaining a first signature execution trace of at least one task within the plurality of concurrent workflows representing a first resource allocation configuration, and a second signature execution trace of said at least one task within the plurality of concurrent workflows representing a second resource allocation configuration;
identifying a first sequence of time intervals in said first signature execution trace for said at least one task that corresponds to a second sequence of time intervals in said second signature execution trace for said at least one task based on a similarity metric; and
identifying a given time interval in said first and second corresponding sequences of time intervals for said at least one task as a resource bottleneck of one or more resources that differ between said first resource allocation configuration and said second resource allocation configuration based on a change in execution time for the given time interval between the first signature execution trace and the second signature execution trace.

9. The system of claim 8, wherein the resource bottleneck identifies said at least one task within the plurality of concurrent workflows as responsive to changes in the resource allocation of the corresponding resources.

10. The system of claim 9, wherein the allocation of said corresponding resources in a new execution of a plurality of workflows comprised of said at least one task is adjusted to substantially minimize said resource bottleneck.

11. The system of claim 9, wherein a new execution of a plurality of workflows comprised of said at least one task is substantially optimized by adjusting said corresponding resources in order to substantially minimize said resource bottleneck.

12. The system of claim 8, wherein said step of obtaining said first signature execution trace comprises disaggregating data related to batches of executions of the plurality of concurrent workflows.

13. The system of claim 8, wherein said step of identifying said first and second sequences of time intervals comprises aligning said first sequence of time intervals and said second sequence of time intervals based on telemetry data information in said first signature execution trace and second signature execution trace.

14. The system of claim 8, wherein step of said identifying said first and second sequences of time intervals comprises substantially maximizing the similarity metric.

15. A computer program product, comprising a tangible machine-readable storage medium having encoded therein executable code of one or more software programs, wherein the one or more software programs when executed by at least one processing device perform the following steps:
obtaining a state of multiple workflow executions of a plurality of concurrent workflows in a shared infrastructure environment, wherein said multiple workflow executions are performed with a plurality of different resource allocation configurations, wherein said state comprises provenance data of said multiple workflow executions and wherein each of said multiple workflow executions is comprised of one or more tasks;
obtaining a first signature execution trace of at least one task within the plurality of concurrent workflows representing a first resource allocation configuration, and a second signature execution trace of said at least one task within the plurality of concurrent workflows representing a second resource allocation configuration;
identifying a first sequence of time intervals in said first signature execution trace for said at least one task that corresponds to a second sequence of time intervals in said second signature execution trace for said at least one task based on a similarity metric; and
identifying a given time interval in said first and second corresponding sequences of time intervals for said at least one task as a resource bottleneck of one or more resources that differ between said first resource allocation configuration and said second resource allocation configuration based on a change in execution time for the given time interval between the first signature execution trace and the second signature execution trace.

16. The computer program product of claim 15, wherein the resource bottleneck identifies said at least one task within the plurality of concurrent workflows as responsive to changes in the resource allocation of the corresponding resources.

17. The computer program product of claim 16, wherein the allocation of said corresponding resources in a new execution of a plurality of workflows comprised of said at least one task is adjusted to substantially minimize said resource bottleneck.

18. The computer program product of claim 15, wherein said step of obtaining said first signature execution trace comprises disaggregating data related to batches of executions of the plurality of concurrent workflows.

19. The computer program product of claim 15, wherein said step of identifying said first and second sequences of time intervals comprises aligning said first sequence of time intervals and said second sequence of time intervals based on telemetry data information in said first signature execution trace and second signature execution trace.

20. The computer program product of claim 15, wherein step of said identifying said first and second sequences of time intervals comprises substantially maximizing the similarity metric.

* * * * *